United States Patent [19]

Nelson et al.

[11] 4,180,784
[45] Dec. 25, 1979

[54] FREQUENCY MODULATED ELECTRICAL DISCHARGE LASER

[75] Inventors: Donald J. Nelson, Seattle; Denis J. Pistoresi, Kent; Michael F. Weisbach, Seattle, all of Wash.

[73] Assignee: The Boeing Company, Seattle, Wash.

[21] Appl. No.: 834,289

[22] Filed: Sep. 19, 1977

[51] Int. Cl.² ............................................. H01S 3/097
[52] U.S. Cl. ............................................. 331/94.5 PE
[58] Field of Search ...................... 331/94.5 C, 94.5 G, 331/94.5 P, 94.5 PE, 94.5 M

[56] References Cited
U.S. PATENT DOCUMENTS

| 3,639,804 | 2/1972 | Hernquist | 331/94.5 PE |
| 3,708,758 | 1/1973 | Snow et al. | 331/94.5 PE |
| 3,777,279 | 12/1973 | Eckbreth et al. | 331/94.5 PE |
| 3,938,060 | 2/1976 | Kato et al. | 331/94.5 P |

*Primary Examiner*—William L. Sikes
*Attorney, Agent, or Firm*—Cole, Jensen & Puntigam

[57] ABSTRACT

An improvement in an electrical discharge laser. The improvement consists of modulating the input power to the laser; specifically, in the case of a gas laser for instance, either (1) the power to the electron gun which produces an electron beam used for preionization of the gas, or (2) the power to the main discharge electrodes of the laser. The parameters of the modulation, i.e. its frequency and depth, are matched to the vibration energy transfer characteristics of the molecules of the lasing medium, which in the preferred embodiment is a CO mixture.

10 Claims, 8 Drawing Figures

FREQUENCY MODULATED ELECTRICAL DISCHARGE LASER

BACKGROUND OF THE INVENTION

The Government has rights in this invention pursuant to contract No. F29601-76-C-0092, awarded by The Department of Defense of the United States of America.

The present invention relates generally to the art of lasers, and more specifically concerns an improvement in lasers which results in an increase in operating efficiency.

The efficiency of an electrical discharge laser, specifically the ratio of the amount of optical power out of the laser over the amount of electrical power into the laser, is an important factor in laser performance. It is generally desirable that laser efficiency be as high as possible. When laser efficiency is increased, it is usually in the form of a higher optical power output for a given maximum amount of electrical power input. However, another aspect of increased efficiency is that it makes possible a reduction in size and weight of the laser. A reduction in laser size and weight is particularly important in certain applications, such as airborne systems, in which strict weight and volume constraints exist. Previously, certain electrical discharge lasers could not be used in many airborne applications because the size and weight of such laser necessary to supply the desired levels of output power exceeded the established limits.

One method of increasing efficiency is to minimize device-associated losses through careful design of the laser channel. A considerable portion of the technical effort to increase laser efficiency has been directed toward the reduction of device-associated losses. The present invention, however, is not concerned with reducing device-associated losses and hence it may be used with a variety of existing lasers. It concerns a modification of the input power signal, and results in an enhancement of the lasing effect while reducing the amount of input energy required to achieve a given level of output power, thus permitting a reduction in the size and weight of the laser power apparatus to the extent that laser applications in airplanes are now more practical.

In view of the current state of the art in laser technology, it is a general object of the present invention to provide an improvement to current laser apparatus.

It is a further object of the present invention to provide such an improvement which increases the operating efficiency of a laser.

It is another object of the present invention to provide such an improvement which results in a reduction of the weight and volume of the power apparatus of a laser without decreasing the laser's output power.

It is an additional object of the present invention to provide such an improvement which may be used with various existing lasers.

SUMMARY OF THE INVENTION

Accordingly, there is provided an improvement for those lasers in which the inversion population is enhanced by a factor or factors other than the input power applied to the laser. In the CO laser, for example, such a factor is the collisions between the CO molecules. The improvement consists of modulating the input power to the laser, with the modulation pulse width and the modulation depth being controlled such that the output power of the laser increases during modulation relative to the output power of the laser without modulation.

DESCRIPTION OF THE DRAWINGS

A more thorough understanding of the invention may be obtained by a study of the following detailed description taken in connection with the accompanying drawings in which.

DESCRIPTION OF THE PREFERRED EMBODIMENT

Figure 1A:
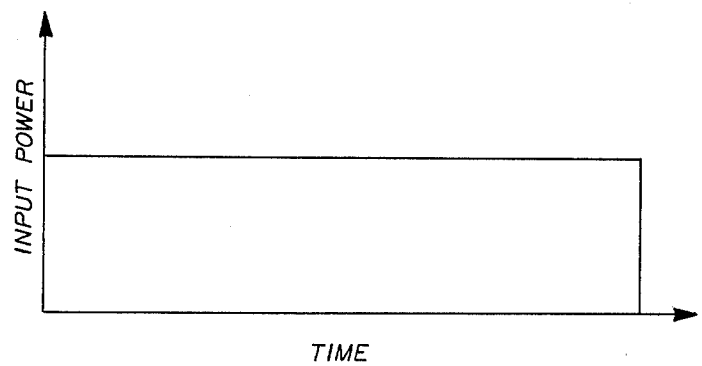
FIG. 1a is a prior art signal diagram showing a continuous power input to the electrodes of an electrical discharge laser.
Figure 1B:
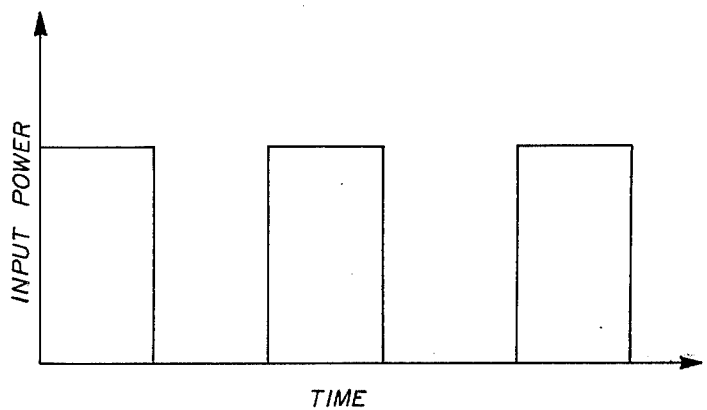
FIG. 1b is a prior art signal diagram showing a pulsed power input to the electrodes of an electrical discharge laser.

FIGS. 1a and 1b show conventional wave forms for the input power to an electrical discharge gas laser. Similar wave forms are used for input power to other types of lasers. Typically, the input power signal is either a continuous wave such as shown in FIG. 1a, or a series of pulses, as is shown in FIG. 1b.

Different lasers have different power requirements. In a preionized electrical discharge gas laser, for instance, input power is required both to ionize the gas medium in the discharge region of the laser, and to establish a current through the gas medium in the discharge region following ionization of the gas.

Generally, the higher the input electrical power to a laser, within its operating range, the higher the optical power output. Conversely, a decrease or interruption in input power results in a decrease in optical power output.

It has been discovered by the inventors, however, that under certain lasing conditions, laser output power is increased by momentarily interrupting or modulating the laser input power. In a CO gas laser, for example, following the establishment of main discharge current, it has been found by the inventors that the random collision process of the CO molecules is itself sufficient to produce the required inversion, i.e. the reorienting the energy stored in the lower vibrational energy states of the CO molecule to the higher energy states which are suitable for lasing. Continuous power input to the gas during this period has been found to impede rather than enhance the lasing effect, resulting in a decrease in power output.

Typically, the energy applied to the gas medium by means of the main discharge current is absorbed into the various vibrational energy states of the gas molecules. In order to facilitate and sustain lasing, as much as possible of the energy applied to the gas should be stored in the higher energy states of the molecules, as it is the existence of sufficient energy in these higher vibrational states which results in lasing.

Generally, the energy applied to the gas medium by means of the main discharge current will continuously produce a reorienting of the stored energy into the higher states, and is indeed necessary to maintain lasing in most circumstances. However, as mentioned above, after the onset of lasing in certain types of lasers, the combined effect of continuous energy input by the main discharge current and the molecular collision phenomenon results in a degradation in the inversion of the higher energy states, which is in turn detrimental to lasing.

This condition has been observed by the inventors, and to the best of their knowledge has not been previously reported. In attempting to correct this detrimental effect, the inventors have discovered that interruption of input power at precise intervals, for precise periods of time, following the onset of lasing will eliminate the inversion degradation. Surprisingly, laser system performance actually increases during the times that the input power is interrupted. During the intervals of input power interruption, the continuous collision of the CO gas molecules is sufficient alone to maintain the inversion.

Figure 2A:
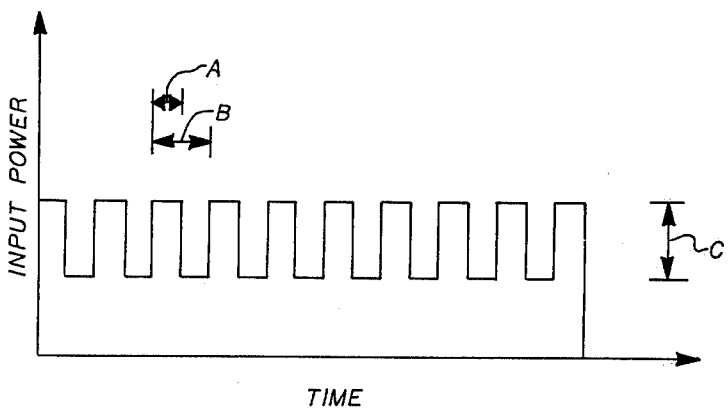
FIG. 2a is a signal diagram showing the continuous wave input signal of FIG. 1a modified in accordance with the principles of the present invention.
Figure 2B:
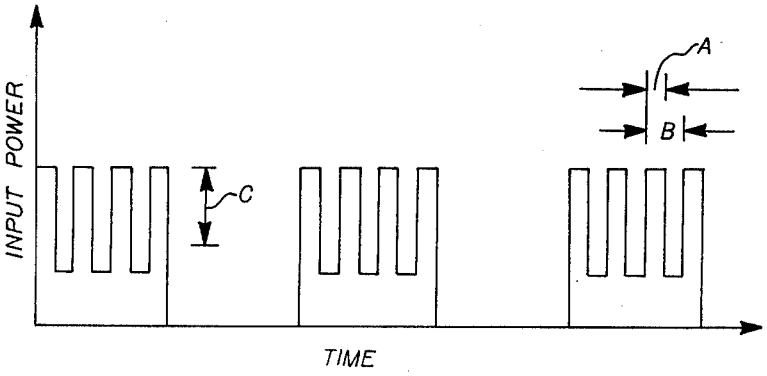
FIG. 2b is a signal diagram showing the pulsed wave input of FIG. 1b modified in accordance with the principles of the present invention.
Figure 4:
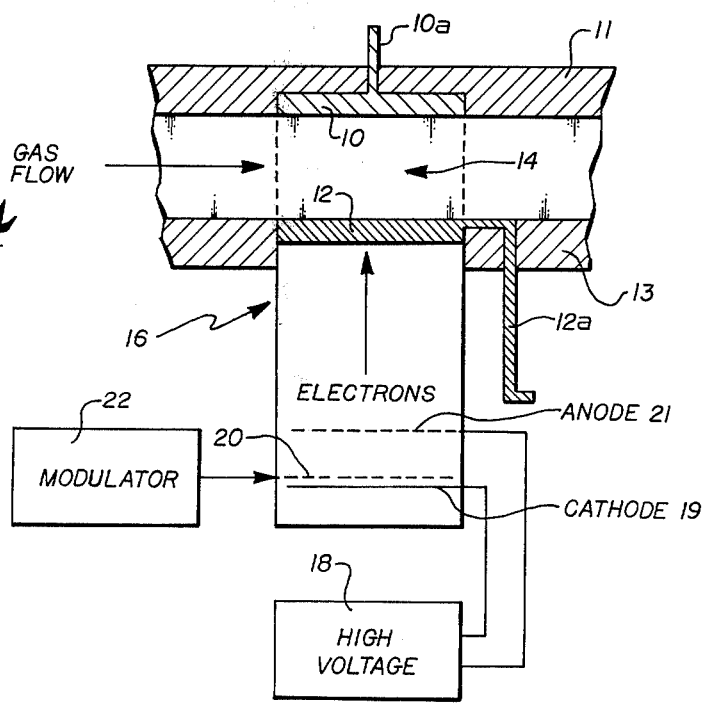
FIG. 4 is a simplified block diagram showing one embodiment for implementing the improvement of the present invention.

Accordingly, the input power to the laser is modulated, within certain defined ranges of depth and width, as shown for an embodiment using an electron beam preionized gas laser in the diagrams of FIGS. 2a and 2b, by means of structure which is shown in simple block diagram form in FIG. 4.

Referring now to FIG. 4, gas flows past the main discharge electrodes 10 and 12, to which is applied a high voltage through terminal connections 10a and 12a respectively. The level of the high voltage will depend on the electrical spacing of the main discharge electrodes, and the gas pressure, but typically, might be on the order of 40–50 kilovolts.

The dimensions of the laser channel, defined between top and bottom channel walls 11 and 13 and connecting side walls (not shown), and the characteristics of the gas medium in a preionized electrical discharge laser are generally such, however, that the main discharge voltage is not sufficient alone to establish a current in the discharge region 14 between discharge electrodes 10 and 12, until the gas in the discharge region 14 is first ionized.

The ionization of the gas may be accomplished by several conventional methods. One such method uses a conventional device known as an electron gun 16, which in laser applications such as herein described, has the capability of accelerating electrons to 130–200 kilovolts in the vacuum established in the gun. Electrons are accelerated by means of a high voltage supply 18 between a cathode 19 and an anode 21, which may be a screen so that it is primarily transparent to the electrons.

The accelerated electrons then proceed upward and through a window in the electron gun which is partially coincident with one of the discharge electrodes. The accelerated electrons then proceed into discharge region 14 where they collide with the gas molecules, producing ionization of the gas. When the gas is ionized, its conductivity is increased to the point where the main discharge current may now be established in the discharge region 14 by virtue of the voltage on the discharge electrodes 10 and 12.

Under such an arrangement, the total input power provided to the laser, including the main discharge current, can be controlled by controlling the operation of the electron gun 16. In the embodiment shown, the input power is modulated by modulating the output of the electron gun 16. The electron gun 16 operates, as explained above, similarily to a conventional vacuum tube, with the electrons being accelerated from a cathode to an anode through a high voltage field established by high voltage supply 18.

The electron gun 16 may also include a grid-like arrangement 20 for control of the output. A conventional modulator 22 is shown in FIG. 4 and a signal provided on grid 20 by modulator 22, on the order of 100V-several kilovolts and higher, depending on the output desired, results in a modulation of the output of electron gun 16. This results in a modulation of the ionization of the gas, and hence, as explained above, a modulation of the main discharge current. Alternatively, the high voltage supply 18 could itself be modulated and similar results would be accomplished. The use of a grid modulation, however, is somewhat easier to implement.

Although the above-described method has been determined to be convenient and is currently the best mode contemplated by the inventors, it is possible to directly modulate the main discharge current by modulating the voltage applied to the discharge electrodes 10 and 12. In such a case, the main discharge current is interrupted even though the gas medium remains ionized.

It is also possible, in certain applications, to modulate both the electron beam and the main discharge voltage. Modulation of both the electron beam and the main discharge voltage has the added advantage of insuring against the possibility of arcing between the main discharge electrodes following interruption of the electron beam during modulation.

Typical wave forms for both the modulated continuous input wave and the modulated pulsed input wave are shown in FIGS. 2a and 2b, respectively. Again, as in FIGS. 1a and 1b, main discharge current is plotted against time. The parameters of the modulation, i.e. modulation depth, and modulation width, should be within certain specific ranges in order to achieve the desired result, i.e. an increase in output power when the input power is interrupted. It should be understood that the ranges of modulation parameters will vary somewhat depending upon the particular laser medium being used.

To date the modulation of laser input power has been found experimentally to be successful with certain types of gas lasers. It is expected, however, that modulation of input power will have the same beneficial result whenever there exists a physical phenomenon which occurs in the laser medium, independent of input energy, which produces a reorienting of the available molecular energy into a more desirable higher level vibrational energy states, i.e. an inversion. Such a phenomenon occurs in a CO gas laser by virtue of the collisions between the CO molecules.

It has been determined by the inventors that the following modulation parameters are applicable for a CO laser: (1) the on time for the input power (time A in FIGS. 2a and 2b) equals:

$$(0.6 \ \mu s \ \text{to} \ 15 \ \mu s) \times \frac{1.35 \times 10^{18}}{N} \times \frac{\sqrt{70}}{\sqrt{T}}$$

the pulse repetition period (time B in FIGS. 2a and 2b) equals:

$$(1.0 \ \mu s \ \text{to} \ 30 \ \mu s) \times \frac{1.35 \times 10^{18}}{N} \times \frac{\sqrt{70}}{\sqrt{T}}$$

the depth of modulation (distance C in FIGS. 2a and 2b) equals 45% to 100%; and (time A/time B) = 0.3 to 0.8 where N is the CO number density in molecules per $CM^3$ and T is the lasing gas temperature in degrees K. When the modulation pulses are not square, time A is defined as the time of the width of an on-time pulse at one-half of the pulse height.

For a 10/10/80 CO/He/Ar mixture at a temperature of 70° kelvin and a density of 0.5 amagat, which is a unit density measurement at standard temperature (273° K.) and pressure (1 atmosphere), it has been found that a time A of 2.5 microseconds, a time B of 5 microseconds and a modulation depth C of 75% produced on the order of 25-30% improvement in operating efficiency of a conventional laser. It is expected that increased efficiencies of up to and possibly greater than 50% are possible through use of this technique. Thus, for the CO laser, definite ranges of modulation depth and pulse width have been established. Such ranges may differ somewhat for other types of lasers.

Figure 3A:
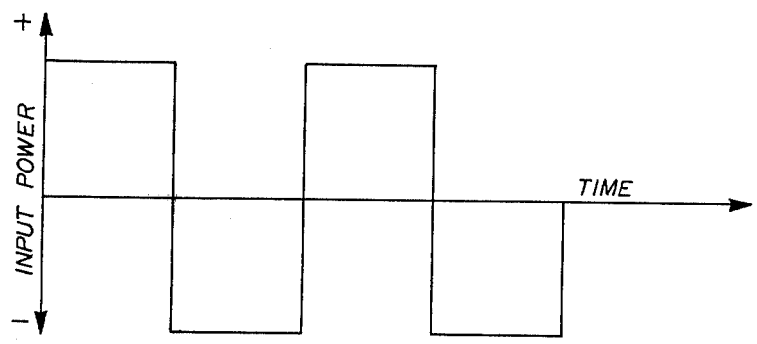
FIG. 3a is a signal diagram showing a continuous alternating current input to the electrodes of an electrical discharge laser.
Figure 3B:
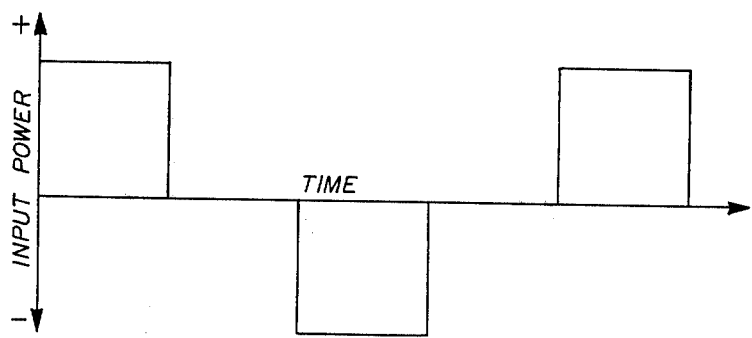
FIG. 3b is a signal diagram showing a pulsed alternating current input to the electrodes of an electrical discharge laser.

Referring now to FIGS. 3a and 3b, another technique is shown for modifying the input power to the laser which results in improved laser performance. Generally, a DC voltage, either in the form of a continuous wave or a pulsed wave, as shown in FIGS. 1a and 1b, is applied to the main discharge electrodes of an electrical discharge laser to produce the current in the discharge region. The amount of current which the gas can handle without arcing is limited by several factors, including the physical separation of the electrodes and the density and density uniformity of the gas medium.

For a given laser, however, the amount of input energy may in some cases be limited below its optimum by the existence of the cathode fall phenomenon, which is a region of high heat near the discharge cathode electrode created by a voltage drop of 200-500 volts over a very small distance. This distance will vary depending on the gas mixture and other operating conditions but representative values are 0.031 millimeters to 0.037 millimeters.

Cathode fall heating exists in electrical discharge gas lasers, and may possibly limit the amount of power that can be put into a given unit volume of gas in the discharge region, since the heating in the cathode fall region may increase the tendency of the device to arc. The present inventors have found, however, that by using an alternating current to the main discharge electrodes, such that the cathode effectively alternates between the two electrodes, it is possible to decrease the heating effect in the cathode fall region and hence potentially increase the amount of power which may be applied to a given unit volume of gas without arcing.

Signal diagrams are shown in FIGS. 3a and 3b for, respectively, a square wave centered about zero, which is comparable to the continuous DC input of FIGS. 1a, and an interrupted square wave, which is comparable to the pulsed DC input of FIG. 1b. The wave forms of FIGS. 3a and 3b may be produced by conventional signal power conditioning circuitry.

The pulse width of the alternating current signals of FIGS. 3a and 3b must be sufficiently short that the previous heating extremes in the cathode fall region do not occur during a single pulse time. It has been found that a pulse time on the order of one-half of the pulse width in pulsed lasers or one-half of the time for the gas to flow through the discharge region in continuous lasers produces the desired reduction in the cathode fall heating.

Figure 3C:
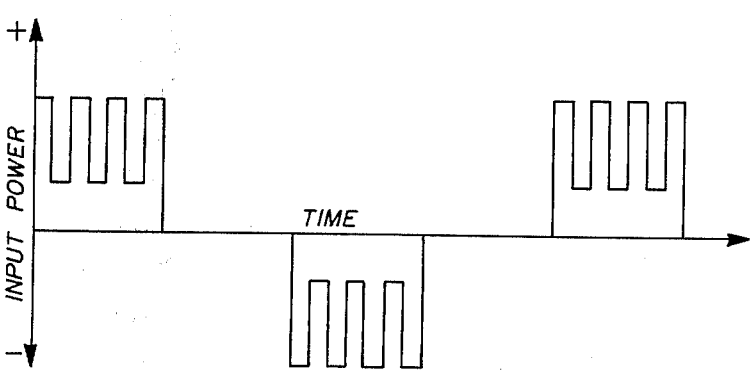
FIG. 3c is a signal diagram showing the input signal of FIG. 3b modified as in FIG. 2b.

The use of an alternating current to the main discharge electrodes may be used alone, to combat the cathode fall heating problem, or it can be used with the modulation technique described above. FIG. 3c shows the use of modulation in the alternating current pulsed mode of FIG. 3b. The modulation not only provides the advantageous lasing effect noted above, but also assists in producing the extremely short pulse times necessary in order to reduce cathode fall heating.

Hence, two novel techniques have been disclosed which result in increases in operating performance of a laser, and which may be used with existing lasers. The techniques both involve modification of the input power wave to the laser, and result in improved system performance. The increase in operating efficiency achieved by modulating the input power is in itself a significant advantage, but another corresponding advantage is the significant reduction in the weight and volume of the input power apparatus of the laser. The reduction in weight and volume makes existing laser systems having the required power capability more practical for use in airborne applications.

Although an exemplary embodiment of the invention has been disclosed herein for purposes of illustration, it should be understood that various changes, modifications and substitutions may be incorporated in such embodiment without departing from the spirit of the invention. For instance, it should be understood that the above-described techniques are not limited to gas lasers, or electrical discharge lasers, but may be used with a variety of lasers. For example, modulation of the discharge in ultra-violet, preionized, avalanche or self-sustained discharge lasers, as well as perhaps still other lasers, will produce the desired result. Hence, the invention is defined only by the claims which follow.

What is claimed is:

1. In a laser in which the inversion population is enhanced by a factor or factors other than the input power applied to the laser, such as by molecular collisions in a gas laser, wherein the improvement comprises:

means for modulating the input power applied to the laser, which has a given amplitude, by a modulating signal having a modulation frequency and a modulation amplitude; and control means establishing the modulation frequency and modulation amplitude at levels such that the average power output of the laser increases for the given amplitude of input power.

2. The apparatus of claim 1, wherein the modulating signal is a pulse series, and wherein the amplitude of the modulating signal is such that the leading edge of the modulating signal causes a decrease in the input power of the laser from an original level at a first point in time at which degradation of inversion occurs to a second level where the inversion degradation substantially ceases, and wherein the pulse width of the modulating signal is such that the trailing edge of the modulation signal, which results in an increase in the input power of the laser to the original level, occurs at a second point in time, when an increase in input power from the second level to the first level results in an enhancement of inversion.

3. The apparatus of claim 2, wherein the ratio of the pulse width of the laser input power over the pulse repetition period of the laser input power is within the range of 0.3 to 0.8.

4. The apparatus of claim 3, wherein the amplitude of the modulating signal is sufficient to result in a depth of modulation within the range between 45% and 100%.

5. The apparatus of claim 4, wherein the laser is an electrical discharge gas laser in which the gas is preionized by an electrical signal, and wherein said modulating means includes means for modulating said electrical signal.

6. A method for increasing the efficiency of a laser in which the inversion population is enhanced by a factor or factors other than the input power applied to the laser, such as molecular collisions in a gas laser, comprising the steps of:
 a. modulating the input power applied to the laser, which has a given amplitude, by a modulating signal having a modulation frequency and a modulation amplitude; and
 b. establishing the frequency and amplitude of the modulating signal at levels such that the average power output of the laser increases for the given amplitude of input power.

7. The method of claim 6, wherein the modulating signal is a pulse series, and wherein the amplitude of the modulating signal is such that the leading edge of the modulating signal causes a decrease in the input power of the laser from an original level at a first point in time at which degradation of inversion occurs to a second level where the inversion degradation substantially ceases, and wherein the pulse width of the modulating signal is such that the trailing edge of the modulation signal, which results in an increase in the input power of the laser to the original level occurs at a second point in time, when an increase in input power from the second level to the first level results in an enhancement of inversion.

8. The method of claim 7, wherein the ratio of the pulse width of the laser input power over the pulse repetition period of the laser input power is within the range of 0.3 to 0.8.

9. The method of claim 8, wherein the amplitude of the modulating signal is sufficient to result in a depth of modulation within the range between 45% and 100%.

10. In an electrical discharge, flowing-gas laser having at least two main discharge electrodes between which the main discharge current occurs to establish lasing in a discharge region, the improvement comprising:
 means for supplying an alternating current voltage to the main discharge electrodes, wherein the period of each half cycle of the alternating current voltage is less than the time for a given plane of gas to flow through the discharge region in the laser.

* * * * *